United States Patent Office 3,340,111
Patented Sept. 5, 1967

3,340,111
SOLID PROPELLANT CATALYZED WITH
COPPER-CHROMIUM COMPLEX
Manfred Stammler, Carmichael, Calif., assignor to Aerojet-General Corporation, Azusa, Calif., a corporation of Ohio
No Drawing. Filed Mar. 26, 1963, Ser. No. 268,527
10 Claims. (Cl. 149—19)

This invention relates to novel burning rate accelerators and their use in polyurethane propellants.

Burning rate accelerators, such as copper chromite have been widely used in polyurethane propellants. The commercially available copper chromite is actually an admixture of copper oxide and metal spinels. This material is prepared by roasting the copper-chromium complex obtained by reacting a mixture of copper nitrate or copper sulfate and sodium dichromate with an amount of ammonium hydroxide stoichiometrically equivalent to the total amount of copper and chromium initially present. However, these accelerators thus prepared have not proved entirely satisfactory since the burning rate which these materials provide in a polyurethane propellant is not reproducible from batch to batch, except within very broad limits. In solid propellants, these variations result in unpredictable changes in the combustion rate of the propellant. These changes may alter the ballistic properties of the rocket or missile and can cause the rocket or missile to deviate from the programmed course of flight.

Accordingly, it is an object of this invention to prepare novel burning rate accelerators for polyurethane propellants which will provide reproducible burning rates. It is still another object of this invention to provide burning rate accelerators for polyurethane propellants which eliminate the unpredictable changes in propellant combustion which tend to alter the ballistic properties of the rocket. These and other objects of this invention will be apparent from the detailed description which follows.

It has now been found that burning rate accelerators which provide highly reproducible results in polyurethane-type propellants may be prepared by roasting the copper-chromium complex obtained by reacting water soluble copper salt of the formula $Cu_aZ_x$ with up to a stoichiometric amount of a compound of the formula $M_yCr_2O_7$ and an amount of ammonium hydroxide which is less than stoichiometric with respect to the total amount of copper and chromium initially present in the $Cu_aZ$ and $M_yCr_2O_7$, respectively. Preferably, the amount of ammonium hydroxide employed is equal to about 50 mole percent to about 90 mole percent of the stoichiometric amount. As is noted above, the $Cu_aZ_y$ can be employed with up to a stoichiometric amount of the $M_yCr_2O_7$. Normally the amount of $M_yCr_2O_7$ utilized should be within the range of from about 40 mole percent to 100 mole percent of the amount that is stoichiometrically equivalent to the $Cu_aZ_x$ initially present. In general, the stoichiometric mole ratio of $Cu_aZ_x/M_yCr_2O_7$ ammonium hydroxide is 1/0.5/2. Thus, it can be seen that the copper chromium complex may be prepared by employing per mole of the $Cu_aZ_x$, from 0.5 to 0.2 mole of $M_yCr_2O_7$ and from 1.8 to 0.8 moles of ammonium hydroxide.

In the foregoing, Z is a water soluble anion such as sulfate, nitrate, phosphate and acetate; preferably Z is an anion of a strong mineral acid, such as sulphuric acid, hydrochloric acid, or phosphoric acid, and M is an alkali or alkaline earth metal such as sodium, potassium, or calcium. "$x$" in the above formula is either one or two, $a$ is either one or three with the product of $x$ times the valence of Z being equal to two times $a$. "$y$" is either one or two with the product of $y$ times the valence M being equal to two.

The product obtained in this manner is a copper-chromium complex which also contains chemically bond nitrogen which is subsequently evolved as nitrogen gas during the roasting process. The roasting of the complex is carried out at a temperature of about from 200° C. to about 500° C., preferably from 425° C. to 475° C., for a period of from about 0.1 to about 10 hours, to obtain the desired catalyst.

The compound designated $Cu_aZ_x$ may be, for example, copper sulfate, copper nitrate, copper acetate, or copper phosphate. It is to be understood that the copper salts of this invention may be in either anhydrous form or contain from 1 to about 5 moles of water of crystallization per mole of the salt. The compounds $M_yCr_2O_7$ in the above equation may be, for example, sodium dichromate, potassium dichromate, or calcium dichromate.

In preparing the copper-chromium, the ammonium hydroxide may be provided either as such, or by bubbling ammonia gas into the aqueous solution.

The preparation of the copper-chromium complex is normally carried out in polar solvent such as water at room temperature, and the complex obtained isolated by precipitation. However, the temperature employed is not critical and may be varied over a wide range of temperatures, of from about 0° C. to 100° C. The yield of the copper-chromium complex may be optionally improved by the inclusion in the reaction mixture of a small amount of an alkali or alkaline earth metal hydroxide.

The following examples illustrate the method of obtaining the novel burning rate accelerators of this invention. In the examples the parts are by weight unless otherwise indicated.

*Example I*

360 grams of $Cu(NO_3)_2 \cdot 3H_2O$ (1.5 moles) are dissolved in 800 ml. of water. While stirring a solution of 178 grams of $Na_2Cr_2O_7 \cdot 2H_2O$ (0.6 mole) in water containing 100 ml. of 28% ammonium hydroxide, (1.6 moles) is poured into the copper salt solution. The brown precipitate is collected on a filter and dried at 75° C. under vacuum. The brown material is then placed in an oven and heated for about 2 hours at 450° C. A good yield of the complex copper burning rate accelerator was obtained.

*Example II*

375 grams of $CuSO_4 \cdot 5H_2O$ (1.5 moles) were dissolved in 850 ml. of water. The pH was adjusted with sodium hydroxide solution to about 7. While stirring a solution of 178 grams of the sodium dichromate in water containing 100 ml. of 28% ammonium hydroxide was poured into the copper salt solution. The precipitate is collected on a filter and dried at 100° C. under vacuum. The precipitate was then roasted in an oven for about 3 hours at 375° C. to obtain the burning rate accelerator.

*Example III*

360 grams of copper nitrate employed in Example I were dissolved in 850 ml. of water. While stirring the solution of 220 grams of the sodium dichromate (0.75 mole) in water containing 100 ml. of 28% ammonium hydroxide was poured into the copper salt solution. The brown precipitate was collected on a filter and dried at 75° C. under vacuum. The precipitate thus obtained was then heated in an oven at 300° C. for about 2.5 hours.

When the above example was repeated employing potassium dichromate in lieu of sodium dichromate equally good results are obtained.

It will be noted that in each of the above examples, the ammonium hydroxide was employed in an amount substantially less than the stoichiometric amount based on the total copper salt and alkali dichromate input.

My novel solid propellants containing the improved burning rate catalyst are used as the primary propulsion source in rockets and missiles. The propellant is preferably cast directly in the rocket chamber in which it is to be fired. Rocket chambers such as those in which my novel solid propellants are employed are ordinarily of the conventional type having one end open and leading into a venturi rocket nozzle. Upon ignition, large quantities of gasses are produced and exhausted through the nozzle creating propulsive force.

The polyurethane binders employed in the practice of my invention are prepared by reacting a compound having two or more active hydrogen groups as determined by the Zerwitinoff method and capable of polymerizing with an isocyanate with an organic compound having as the sole reacting groups two or more isocyanate groups. The compound having the active hydrogen groups is preferably an organic compound having as its sole reacting groups from 2 to 4 hydroxy groups per molecule. Cross-linking agents can also be used with polyurethane reactants of my propellants.

It is evident from the above that a wide variety of polyurethane binders can be prepared by varying the particular isocyanate and hydroxy starting materials. These polyurethane binders are disclosed in greater detail in assignee's copending applications, Ser. Nos. 829,180 and 829,182, both filed July 20, 1959.

The isocyanate compounds can be saturated or unsaturated; aliphatic or aromatic; open or closed chain; and substituted or not by groups substantially unreactive with isocyanate or hydroxyl groups such as, for example, ketone, halogen, ester, or sulfide.

The preferred isocyanates are the diisocyanates which are hydrocarbon except for the isocyanate groups and contain from 1 to 20 carbon atoms. Such diisocyanates include tolylene diisocyanate, hexamethylene diisocyanate and durene diisocyanate.

The preferred hydroxy starting materials for the polyurethane binders are dihydroxy compounds having the general formula HO—R—OH; where R is a divalent organic radical containing from 1 to 20 carbon atoms. The dihydroxy compounds particularly suitable as reactants for the polyurethane binders of this invention are ethylene glycol, tetramethylene glycol, and hexamethylene glycol.

Among the preferred dihydroxy compounds suitable for the polyurethane reactions of this invention are polyesters such as those obtained from the reaction of a dihydric alcohol such as ethylene glycol, diethylene glycol, propylene glycol, butylene glycol, or hexamethylene glycol with a dicarboxlic acid such as succinic acid, adipic acid, sebacic acid, oxadibutyric acid, and related compounds. The polyesters most suitable for purposes of this invention are those having a molecular weight from about 1000 to about 2500.

In addition to the polyesters, the polyols such as the polyethylene ether glycols, polypropylene ether glycol, polytetramethylene ether glycols, and other polyether glycols can be used. These polyols normally have molecular weights of from about 400 to about 10,000 and contain from 2 to 4 hydroxy groups per molecule.

Polysulfides having two or more thiol groups, such as those having the general formula $$HO(CH_2-CH_2-S-S)_x-CH_2CH_2OH$$

where $x$ is a whole number, are other suitable reactants for the polyurethane reaction of this invention.

It will be appreciated by those skilled in the art that mixtures of suitable polyhydroxy and/or polyisocyanate compounds can be used for purposes of this invention if desired.

Examples of compounds which I have found to be particularly suitable as cross-linking agents are glycerol mon- oricinoleate; glycerol triricinoleate; 1,2,6-hexanetriol; methylene bis-(orthochloroaniline); N,N,N',N'-tetrakis (2-hydroxypropyl) ethylenediamine; triethanolamine and trimethylolpropane.

Preferably, the cross-linking agents contain 3 or 4 hydroxyl groups per molecule and have a molecular weight from about 80 to about 800.

The propellants of this invention contain, as oxidizers, the perchlorates of ammonia, hydrazine, guanidine, as well as the perchlorates of organic amines. The perchlorates of organic amines are prepared by reacting approximately stoichiometric amounts of perchloric acid and the amine in a solvent such as methanol or isopropanol. In this manner methyl amine perchlorate can be obtained from methyl amine and ethylene diamino perchlorate from ethylene diamine.

In general, the organic perchlorates prepared in the foregoing manner have the general formula $$R_1(-NH_3-ClO_4)_n$$

wherein $R_1$ is an organic radical, preferably hydrocarbon or heterocyclic having from 1 to 10 atoms, having a valence equal to $n$. The subscript $n$ is a small whole number of from 1 to about 3 and numerically equals the valence of $R_1$. In the above formula, $R_1$ is most preferably lower alkyl of 1 to 3 carbons, or lower alkylene of 2 to 4 carbons. Mixtures of suitable perchlorate oxidizing salts can be used within the scope of this invention.

Various other additives may be employed in preparing the propellants of this invention. For example, plasticizers familiar to those skilled in the art such as isodecyl pelargonate; 4-nitrazapentanonitrile; 2,2-dinitropropyl-4-nitrazapentanoate and dioctyl azelate may be utilized. Also, catalysts for the polyurethane reaction such as triethylamine and ferric acetylacetonate can be employed if desired. The catalysts can be employed in quantities within the range from about 0.02 to about 0.10 percent by weight, on a total weight basis.

The novel burning rate acclerators of my invention is employed in an effective catalytic amount of from about 0.1% to about 4%, by weight, based on the total weight of propellant.

Various additives other than those specifically mentioned can be employed, in minor amounts, in the propellant formulations. For example, phenyl betanaphthylamine can be utilized in very small quantities as an antioxidant.

In preparing the propellants of this invention, the polyurethane polymerization can be conducted at any temperature, with room temperature being the most convenient. However, temperatures lower than, as well as higher than room temperature can be used for the polymerization reaction.

It is preferable to carry out the curing of the propellant at temperatures in the range of from about 70° to about 180° F. Within this range the reaction rate is sufficiently rapid for economical production and yet the temperature is not so high as to produce shrinkage and internal stresses which must be avoided, especially in the case of large solid propellant motors.

The processing of the propellants of this invention can be carried out with standard equipment well-known to those skilled in the art as suitable for the purpose. A mixer which I have found to be particularly effective for mixing my propellant ingredients is that known commercially as the P mixer. The P mixer is manufactured by Baker-Perkins, Inc., of Saginaw, Mich., and it can be equipped with facilities for heating, cooling, and vacuumizing propellant batches during mixing.

The compounding of my propellant can be carried out in conventional manner in accordance with procedures well known to those skilled in the art.

The propellant binder is preferably employed in a proportion within the range from about 5 to about 55 percent and the perchlorate oxidizing salt in an amount within the range from about 95 to about 45 percent by weight. The term binder, when used herein to denote a polyurethane binder, includes not only the diol (or equivalent) and diisocyanate (or equivalent) reaction product, but any cross-linker present as well.

The proportions of the ingredients which go to make up the polyurethane binder can vary through wide ranges, depending on the properties desired in the propellant and the specific reactants employed. Although stoichiometric proportions of hydroxy and isocyanate components can be employed, it has been found that a product of improved mechanical properties is obtained if there is present from about 100 to about 115 equivalents of isocyanate or isothiocyanate containing monomer in the fuel mixture for every 100 equivalents of hydroxy or thiol containing monomer therein.

*Example IV*

| Ingredient | Propellant A, parts by weight | Propellant B, parts by weight | Propellant C, parts by weight | Propellant D, parts by weight |
|---|---|---|---|---|
| Ammonium Perchlorate | 72.00 | 72.00 | 72.00 | 72.00 |
| Aluminium | 12.00 | 12.00 | 12.00 | 12.00 |
| Commercial Copper chromite | 1.00 | 1.00 | | |
| Accelerator of Example I | | | 1.00 | 1.00 |
| Polypropylene Ether glycol | 0.81 | 0.81 | 0.81 | 0.81 |
| Polybutylene Ether glycol | 0.43 | 0.43 | 0.43 | 0.43 |
| Polypropylene Triol (MW=4000) | 8.41 | 8.41 | 8.41 | 8.41 |
| Triethanolamine | 0.05 | 0.05 | 0.05 | 0.05 |
| Tolylene Diisocyanate | 0.80 | 0.80 | 0.80 | 0.80 |
| Isodecyl Pelargonate | 4.50 | 4.50 | 4.50 | 4.50 |
| | 100.00 | 100.00 | 100.00 | 100.00 |

The improved burning rate reproducibility obtained by using the novel accelerators of this invention is illustrated by the above example in which four propellants were prepared. These four propellants were identical in every respect except that two of the propellants contained commerical copper chromite burning rate catalysts and the other two contained the burning rate catalysts of this invention.

Each of the above propellants were cast and cured under identical conditions.

The buring rate of each propellant was measured and the data is set forth below:

| Propellant: | Burning rate (inches/sec.) |
|---|---|
| A | 0.70 |
| B | 0.55 |
| C | 0.61 |
| D | 0.63 |

These results show the excellent reproducibility of the burning rate of a propellant containing my novel accelerators. In contrast thereto, the reproducibility obtained when using the prior art accelerators can be seen to be substantially less, varying from 0.70 inch/sec. in Propellant A to 0.55 inch/sec. in Propellant B.

The following are additional propellants employing the novel accelerators of this invention.

*Example V*

| Ingredient: | Weight percent |
|---|---|
| Ammonium perchlorate | 82.00 |
| Aluminum | 1.00 |
| Accelerator prepared according to Example II | 1.00 |
| Phenyl betanaphthylamine | 0.20 |
| Lecithin | 0.15 |
| Ferric acetylacetonate | 0.06 |
| Polypropylene glycol | 10.20 |
| Glycerol monoricinoleate | 0.80 |
| Dioctyl azelate | 3.12 |
| Tolylene diisocyanate | 1.47 |
| | 100.00 |

*Example VI*

| Ingredient: | Weight percent |
|---|---|
| Ammonium perchlorate | 82.00 |
| Graphite | 1.00 |
| Accelerator preparing according to Example III | 1.00 |
| Phenyl betanaphthylamine | 0.20 |
| Lecithin | 0.15 |
| Ferric acetylacetonate | 0.06 |
| Polypropylene glycol | 10.20 |
| Glycerol monoricinoleate | 0.80 |
| Dioctyl azelate | 3.12 |
| Tolylene diisocyanate | 1.47 |
| | 100.00 |

*Example VII*

| Ingredient: | Weight percent |
|---|---|
| Potassium perchlorate | 81.50 |
| Accelerator prepared according to Example I | 0.50 |
| Aluminum | 2.00 |
| Ferric acetylacetonate | 0.07 |
| Glycerol monoricinoleate | 0.82 |
| Tolylene diisocyanate | 1.50 |
| Dioctyl azelate | 3.18 |
| Polypropylene glycol | 10.43 |
| | 100.00 |

Having fully described my invention, it is intended to be limited only by the lawful scope of the appended claims.

I claim:

1. The novel burning rate accelerator prepared by roasting at a temperature of from about 200° C. to about 500° C. for a period of time of from about 0.1 to about 10 hours, the copper-chromium complex obtained by reacting in solution a water-soluble copper salt selected from the group consisting of copper sulfate, copper nitrate, copper phosphate, and copper acetate with up to a stoichiometric amount of an alkali metal dichromate and an amount of ammonium hydroxide which is less than stoichiometric with respect to the total amount of copper and chromium containing reactants initially present.

2. The novel burning rate accelerator prepared by roasting at a temperature of from about 200° C. to about 500° C. for a period of from about 0.1 to about 10 hours, the copper-chromium complex obtained by reacting in solution copper nitrate with up to a stoichiometric amount of an alkali metal dichromate and an amount of ammonium hydroxide which is less than stoichiometric with respect to the total amount of copper nitrate and alkali metal dichromate initially present.

3. The method of preparing a novel burning rate accelerator which comprises preparing an aqueous solution of a water-soluble copper salt, a metal dichromate selected from the group consisting of an alkali metal dichromate and an alkaline earth metal dichromate, and ammonium hydroxide, there being present per mole of said copper salt, from about 0.5 to about 0.2 mole of said metal dichromate, and from about 1.8 to about 0.8 mole of ammonium hydroxide with the amount of ammonium hydroxide ranging from about 50% to about 90% of the stoichiometric amount with respect to the total amount of said copper salt and said dichromate reactants, isolating the copper chromium complex obtained and roasting said complex at a temperature of from 200° C. to about 500° C. for from about 0.1 to about 10 hours.

4. The novel burning rate accelerators prepared by roasting at a temperature of from about 200° C. to about 500° C. for a period of from about 0.1 to about 10 hours, the copper-chromium complex obtained by reacting an aqueous solution of a water-soluble copper salt with up to a stoichiometric amount of a compound selected from the group consisting of the alkali metal dichromates and the alkaline earth metal dichromates, and an amount of ammonium hydroxide which is less than stoichiometric with respect to the total amount of copper and chromium containing reactants initially present.

5. The novel burning rate accelerators which are prepared by roasting at a temperature of from about 200° C. to about 500° C. before a period of from about 0.1 to about 10 hours, the copper-chromium complex obtained by the reacting in solution a water-soluble copper salt of the formula: $Cu_aZ_x$ wherein Z is a water-soluble anion, $x$ as an integer ranging from one to two, $a$ is selected from the group consisting of one and three with the product of $x$ times the valence of Z being equal to $a$ times two with up to a stoichiometric amount of a compound of the formula: $M_yCr_2O_7$ wherein M is selected from the group consisting of alkali and alkaline earth metals, and $y$ is an integer ranging from one to two with the product of $y$ times the valence of M being equal to two, and an amount of ammonium hydroxide which is from about 50% to about 90% of the stoichiometric amount with respect to the total amount of copper and chromium containing reactants initially present.

6. A solid propellant composition which comprises a cured intimate mixture of a solid perchlorate oxidizing salt, and a polyurethane resin binder which comprises the reaction product of a compound having as its sole reacting groups not less than two active hydrogen groups as determined by the Zerewitinoff method and capable of polymerizing with an isocyanate and a compound having as its sole reacting groups not less than two groups capable of undergoing a urethane-type reaction with hydroxy groups and, as a burning rate accelerator, the material prepared by roasting at a temperature of from about 200° C. to about 500° C. for a period of from about 0.1 to about 10 hours the copper-chromium complex obtained by reacting in solution a water-soluble copper salt up to a stoichiometric amount of a compound of the formula: $M_yCr_2O_7$ wherein M is selected from the group consisting of alkali and alkaline earth metals, and $y$ is an integer ranging from one to two with the product of $y$ times the valence of M being equal to two, and an amount of ammonium hydroxide which is less than stoichiometric with respect to the total amount of copper and chromium containing reactants initially present.

7. A solid propellant composition which comprises a cured intimate mixture of a solid perchlorate oxidizing salt, and a polyurethane resin binder which comprises the reaction product of a compound having as its sole reacting groups not less than two active hydrogen groups as determined by the Zerewitinoff method and capable of polymerizing with an isocyanate and a compound having as its sole reacting groups not less than two groups capable of undergoing a urethane-type reaction with hydroxy groups and, as a burning rate accelerator, the material prepared by roasting at a temperature of from about 200° C. to about 500° C. for from about 0.1 to about 10 hours, the copper-chromium complex obtained by reacting in solution a water-soluble copper salt with up to a stoichiometric amount of a compound of the formula: $M_yCr_2O_7$ wherein M is selected from the group consisting of alkali and alkaline earth metals, and $y$ is an integer ranging from one to two with the product of $y$ times the valence of M being equal to two, and an amount of ammonium hydroxide which is less than stoichiometric with respect to the total amount of copper and chromium containing reactants initially present, said burning rate accelerator being present in an effective catalytic amount of not greater than that equivalent to about 4% by weight of the total propellant composition.

8. A solid propellant composition which comprises a cured intimate mixture of a solid perchlorate oxidizing salt, and a polyurethane resin binder which comprises the reaction product of an aromatic diisocyanate, a polyether having a molecular weight between about 400 and 10,000 and a hydroxy cross-linker compound and, as the burning rate accelerator, the material which is prepared by roasting at a temperature of from about 200° C. to about 500° C. for from about 0.1 to about 10 hours, the copper-chromium complex obtained by reacting in solution a water-soluble copper salt with up to a stoichiometric amount of a compound selected from the group consisting of alkaline metal dichromates and alkaline earth metal dichromates and an amount of ammonium hydroxide which is less than stoichiometric with respect to the total amount of copper and chromium containing reactants initially present, said burning rate accelerator being present in an amount of not greater than about 4% by weight, the polyurethane resin binder being present in an amount of between about 5 and about 55 percent by weight, and the solid perchlorate oxidizing salt being present in an amount of from between 95 and about 45 percent by weight, all percentages being given on a total weight basis.

9. A solid propellant composition which comprises a cured intimate mixture of a solid perchlorate oxidizing salt, and a polyurethane resin binder which comprises the reaction product of a compound having as its sole reacting groups not less than two active hydrogen groups as determined by the Zerewitinoff method and capable of polymerizing with an isocyanate and a compound having as its sole reacting groups not less than two groups capable of undergoing a urethane-type reaction with hydroxy groups and, as a burning rate accelerator, the material prepared by roasting at a temperature of from about 200° C. to about 500° C. for from about 0.1 to about 10 hours, the copper-chromium complex obtained by reacting in solution a water-soluble copper salt with up to a stoichiometric amount of a compound of the formula: $M_yCr_2O_7$ wherein M is selected from the group consisting of alkali and alkaline earth metals, $y$ is an integer ranging from one to two with the product of $y$ times the valence of M being equal to two, and an amount of ammonium hydroxide which is from about 50% to about 90% of the stoichiometric amount with respect to the total amount of copper and chromium containing reactants initially present.

10. The solid propellant composition which comprises the cured intimate mixture of a solid perchlorate oxidizing salt, and a polyurethane resin binder which comprises the reaction product of a compound having as its sole reacting groups not less than two active hydrogen groups as determined by the Zerewitinoff method and capable of polymerizing with an isocyanate and a compound having as its sole reacting groups not less than two groups capable of undergoing a urethane-type reaction with hydroxy groups, and as a burning rate accelerator, the material prepared by roasting at a temperature of from about 200° C. to about 500° C. for a period of about 0.1 to about 10 hours, the copper-chromium complex obtained by reacting an aqueous solution of a water-soluble copper salt of the formula: $Cu_aZ_x$ wherein Z is a water soluble anion, $x$ is an integer ranging from one to two, $a$ is an integer selected from the group consisting of one and three with the product of $x$ times the valence of Z being equal to $a$ times two, with up to a stoichiometric amount of a compound selected from the group consisting of alkali and alkaline earth metal dichromates and an amount of ammonium hydroxide which is from about 50% to about 90% of the stoichiometric amount with respect to the total amount of copper and chromium containing reactants initially present.

References Cited

UNITED STATES PATENTS

| | | | |
|---|---|---|---|
| 1,964,000 | 6/1934 | Lazier | 252—467 |
| 1,964,001 | 6/1934 | Lazier | 252—467 |
| 3,002,830 | 10/1961 | Barr | 149—83 X |
| 3,092,527 | 6/1963 | Schaafsma | 149—19 |
| 3,113,057 | 12/1963 | Butcher | 149—19 |

BENJAMIN R. PADGETT, *Primary Examiner.*
CARL D. QUARFORTH, *Examiner.*